(12) United States Patent
Miyakawa et al.

(10) Patent No.: US 10,081,055 B2
(45) Date of Patent: Sep. 25, 2018

(54) COMPOSITE BODY AND METHOD FOR PRODUCING SAME

(71) Applicant: DENKA COMPANY LIMITED, Tokyo (JP)

(72) Inventors: Takeshi Miyakawa, Omuta (JP); Hideki Hirotsuru, Omuta (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 15/328,723

(22) PCT Filed: Jul. 24, 2015

(86) PCT No.: PCT/JP2015/071082
§ 371 (c)(1),
(2) Date: May 3, 2017

(87) PCT Pub. No.: WO2016/013648
PCT Pub. Date: Jan. 28, 2016

(65) Prior Publication Data
US 2017/0239715 A1    Aug. 24, 2017

(30) Foreign Application Priority Data

Jul. 24, 2014  (JP) ................................. 2014-151148

(51) Int. Cl.
*B22D 19/14*         (2006.01)
*B22D 21/00*         (2006.01)
(Continued)

(52) U.S. Cl.
CPC ............ *B22D 19/14* (2013.01); *B22D 18/02* (2013.01); *B22D 21/007* (2013.01); *B32B 5/24* (2013.01);
(Continued)

(58) Field of Classification Search
None
See application file for complete search history.

(56) References Cited

U.S. PATENT DOCUMENTS 4,871,008 A    10/1989  Dwivedi et al.
4,998,578 A     3/1991  Dwivedi et al.
(Continued)

FOREIGN PATENT DOCUMENTS

CN    106463484 A    2/2017
JP    H02-197368 A   8/1990
(Continued)

OTHER PUBLICATIONS

Oct. 6, 2015 International Search Report issued in Patent Application No. PCT/JP2015/071082.
(Continued)

*Primary Examiner* — Tahseen N Khan
(74) *Attorney, Agent, or Firm* — Oliff PLC

(57) ABSTRACT

A composite production method includes impregnating a plate-shaped porous inorganic structure and a fibrous inorganic material with a metal while the fibrous inorganic material is arranged to be adjacent to the porous inorganic structure. In the composite structure, first and second phases are adjacent to each other by using a porous inorganic structure having a porous silicon carbide ceramic sintered body and the fibrous inorganic material, the first phase being a phase in which the porous silicon carbide ceramic sintered body is impregnated with the metal, the second phase being a phase in which the fibrous inorganic material is impregnated with the metal, a percentage of the porous silicon carbide ceramic sintered body in the first phase is 50 to 80 volume percent, and a percentage of the fibrous inorganic material in the second phase is 3 to 20 volume percent. A composite is produced by the method.

13 Claims, 1 Drawing Sheet

(a)

(b)

(51) Int. Cl.
- *B32B 5/24* (2006.01)
- *B22D 18/02* (2006.01)
- *B32B 5/30* (2006.01)
- *C04B 37/00* (2006.01)
- *C22C 21/02* (2006.01)
- *C04B 41/90* (2006.01)
- *C04B 41/00* (2006.01)
- *C04B 41/52* (2006.01)
- *C04B 111/00* (2006.01)

(52) U.S. Cl.
CPC .............. *B32B 5/30* (2013.01); *C04B 37/001* (2013.01); *C04B 41/009* (2013.01); *C04B 41/52* (2013.01); *C04B 41/90* (2013.01); *C22C 21/02* (2013.01); *B32B 2250/02* (2013.01); *B32B 2260/021* (2013.01); *B32B 2260/025* (2013.01); *B32B 2260/04* (2013.01); *B32B 2262/105* (2013.01); *B32B 2264/107* (2013.01); *B32B 2307/302* (2013.01); *B32B 2307/584* (2013.01); *B32B 2311/24* (2013.01); *B32B 2315/02* (2013.01); *B32B 2605/00* (2013.01); *C04B 2111/00844* (2013.01); *C04B 2237/365* (2013.01); *C04B 2237/38* (2013.01); *C04B 2237/61* (2013.01); *C04B 2237/704* (2013.01)

(56) References Cited

U.S. PATENT DOCUMENTS

| | | | |
|---|---|---|---|
| 5,552,352 A * | 9/1996 | Brun | C04B 35/573 428/368 |
| 6,107,225 A * | 8/2000 | Shobu | C04B 35/5607 264/682 |
| 6,399,187 B1 * | 6/2002 | Terasaki | C04B 38/0003 257/E23.009 |
| 6,447,894 B1 | 9/2002 | Hirotsuru et al. | |
| 2009/0092793 A1 * | 4/2009 | Hirotsuru | C04B 41/009 428/158 |
| 2009/0280351 A1 | 11/2009 | Hirotsuru et al. | |
| 2011/0316040 A1 * | 12/2011 | Hirotsuru | B22D 18/02 257/103 |

FOREIGN PATENT DOCUMENTS

| | | |
|---|---|---|
| JP | H05-507030 A | 10/1993 |
| JP | H05-508350 A | 11/1993 |
| JP | H11-269575 A | 10/1999 |
| JP | H11-277217 A | 10/1999 |
| JP | 2003-204022 A | 7/2003 |
| JP | 3468358 B2 | 11/2003 |
| JP | 2010-024077 A | 2/2010 |
| WO | 91/17011 A1 | 11/1991 |
| WO | 92/017297 A1 | 10/1992 |
| WO | 2007/080701 A1 | 7/2007 |
| WO | 2007/125878 A1 | 11/2007 |

OTHER PUBLICATIONS

Nishida, Yoshinori, "Development of Research of Composite Materials Production by Pressure Impregnation," Materia Japan, vol. 36, No. 1, pp. 40-46, (1997).
Jun. 16, 2016 International Search Report issued in International Patent Application No. PCT/JP2015/058068.
Oct. 20, 2017 Office Action issued in U.S. Appl. No. 15/127,214.
U.S. Appl. No. 15/127,214, filed Sep. 19, 2016 in the name of Miyakawa et al.
Feb. 14, 2018 Office Action issued in U.S. Appl. No. 15/127,214.

* cited by examiner

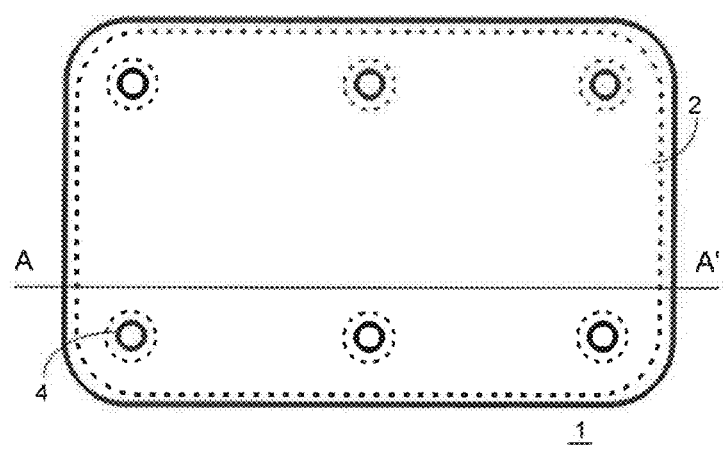
(a)
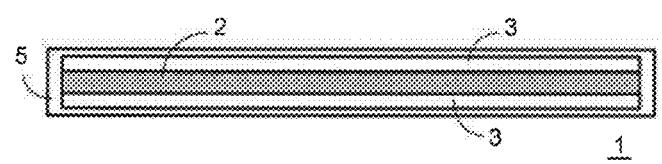
(b)

COMPOSITE BODY AND METHOD FOR PRODUCING SAME

TECHNICAL FIELD

The present invention relates to a composite and a production method thereof.

BACKGROUND ART

Metal-ceramic composites have been expected as materials allowing the achievement of the enhancement of mechanical and thermal properties that cannot be obtained independently by metal and ceramic. Such composites can be applied, for example, as an abrasion-resistant material for a piston component of a vehicle and a heat-dissipating material for a heatsink or the like.

As the ceramic composing the metal-ceramic composite, a porous ceramic structure made by forming ceramic powders or ceramic fibers and further firing the resulting structure when necessary is used. Such a structure is arranged in the space within a desired mold, and by pouring molten metal into the space, the porous ceramic structure is impregnated with the metal. Then, the resulting structure is solidified, so that the metal-ceramic composite is made.

As the method for the impregnation with the molten metal, there are known various methods, as exemplified by methods based on powder metallurgy, methods by pressure casting, such as, for example, a die casting method (Patent Literature 1) and a squeeze casting method (Non Patent Literature 1), and methods by spontaneous penetration (Patent Literature 2).

Patent Literature 1: National Publication of International Patent Application No. 1993-508350

Patent Literature 2: Japanese Patent Laid-Open No. 2-197368

Non Patent Literature 1: Yoshinori Nishida, "Development of Research of Composite Material Production by Pressure Impregnation", Materia Japan, The Japan Institute of Metals and Materials, on Jan. 1, 1997, Vol. 36, No. 1, pages 40-46

SUMMARY OF INVENTION

In conventional production methods, there is a problem in that the porous inorganic structure radiates heat through a jig, a metal mold and the like that support the porous inorganic structure, at the time of the impregnation with the metal, and a local temperature unevenness occurs, so that a uniform composite is not obtained. Further, for example, there is a problem in that the contact of the molten metal with the metal mold decreases the temperature and partially decreases the flow property, and by applying pressure in this state, the porous inorganic structure is broken.

The present invention, which has been made in view of the above circumstance, provides a production method that makes it possible to suppress the breakage of a porous inorganic structure included in a composite and to stably make the composite, and a composite that is produced by the production method.

The present invention provides a production method for a composite including impregnating a plate-shaped porous inorganic structure and a fibrous inorganic material with a metal while the fibrous inorganic material is arranged so as to be adjacent to the porous inorganic structure, in which the composite has a structure in which a first phase and a second phase are adjacent to each other by using a porous inorganic structure comprising a porous silicon carbide ceramic sintered body and the fibrous inorganic material, the first phase being a phase in which the porous silicon carbide ceramic sintered body is impregnated with the metal, the second phase being a phase in which the fibrous inorganic material is impregnated with the metal, a percentage of the porous silicon carbide ceramic sintered body in the first phase is 50 to 80 volume percent, and a percentage of the fibrous inorganic material in the second phase is 3 to 20 volume percent.

According to an aspect of the present invention, in the above production method for the composite, the method for the impregnation with the metal is a die casting method or a squeeze casting method.

According to an aspect of the present invention, in the above production method for the composite, the metal is aluminum or an aluminum alloy.

According to an aspect of the present invention, in the above production method for the composite, a thickness of a layer comprising the second phase is 1 mm or more.

According to an aspect of the present invention, in the above production method for the composite, all surfaces of a circumference of the porous silicon carbide ceramic sintered body are covered with the fibrous inorganic material, or the porous silicon carbide ceramic sintered body is sandwiched between two sheets of the fibrous inorganic material.

The present invention provides a composite having a structure in which a first phase and a second phase are adjacent to each other, the first phase being a phase in which a plate-shaped porous inorganic structure comprising a porous silicon carbide ceramic sintered body is impregnated with a metal, the second phase being a phase in which a fibrous inorganic material is impregnated with the metal, a percentage of the porous silicon carbide ceramic sintered body in the first phase being 50 to 80 volume percent, a percentage of the fibrous inorganic material in the second phase being 3 to 20 volume percent.

According to an aspect of the present invention, in the above composite, the metal is aluminum or an aluminum alloy.

According to an aspect of the present invention, in the above composite, a thickness of a layer comprising the second phase is 1 mm or more.

According to an aspect of the present invention, in the above composite, all surfaces of a circumference of the first phase are covered with the second phase, or the first phase is formed on only front and back plate surfaces of the second phase.

According to the production method for the composite in the present invention, it is possible to suppress the breakage of the porous inorganic structure included in the composite, and to stably make the composite.

BRIEF DESCRIPTION OF DRAWING

FIG. 1 is a diagram showing a conceptual configuration of a composite according to an embodiment of the present invention, in which FIG. 1(a) is a plan view in a plate surface direction of the composite and FIG. 1(b) is a cross-sectional view taken from A-A' in FIG. 1(a).

DESCRIPTION OF EMBODIMENTS

Hereinafter, an embodiment of a production method for a composite and an embodiment of a composite that is produced by the production method in the present invention will be described. However, it is obvious that the present invention is not limited to the embodiments.

[Production Method for Composite]

The production method for the composite in the embodiment is a production method for a composite including impregnating a plate-shaped porous inorganic structure and a fibrous inorganic material with a metal while the fibrous inorganic material is arranged so as to be adjacent to the porous inorganic structure, in which the composite has a structure in which a first phase and a second phase are adjacent to each other by using a porous inorganic structure comprising a porous silicon carbide ceramic sintered body and the fibrous inorganic material, the first phase being a phase in which the porous silicon carbide ceramic sintered body is impregnated with the metal, the second phase being a phase in which the fibrous inorganic material impregnated with the metal, a percentage of the porous silicon carbide ceramic sintered body in the first phase is 50 to 80 volume percent, and a percentage of the fibrous inorganic material in the second phase is 3 to 20 volume percent.

In the production method for the composite that has the above configuration, the heat radiation from the porous inorganic structure through a jig, a metal mold and the like is reduced at the time of the impregnation with the metal, and therefore, it is possible to suppress a local temperature unevenness of the structure and to obtain a uniform composite. Further, it is possible to prevent a partial temperature decrease caused by the contact of the molten metal with the metal mold, and therefore, the decrease in the flow property associated with a partial solidification of the molten metal does not occur, resulting in the effect of few breakages.

As the porous silicon carbide ceramic sintered body composing the porous inorganic structure, there are various porous silicon carbide ceramic sintered bodies that have pores allowing the impregnation with the metal, that are unlikely to cause a deformation, a break or the like in impregnation operation or the like, and that have a mechanical intensity of about 10 MPa, for example.

The production method for the porous silicon carbide ceramic sintered body is not particularly limited, and a known method can be employed. For example, the porous silicon carbide ceramic sintered body can be obtained by adding silica, alumina or the like as a binder to silicon carbide (SiC) powders that are raw materials, and after mixing and forming, firing the resulting body at 800° C. or higher.

The forming method for the structure is not particularly limited, and press forming, extrusion forming, slip casting or the like can be used. When necessary, a shape retaining binder may be also used.

Important characteristics of the first phase in which the porous inorganic structure is impregnated with the metal are thermal conductivity and thermal expansion coefficient. It is preferable that the content percentage of silicon carbide in the porous inorganic structure be high, because the thermal conductivity is high and the thermal expansion coefficient is low. However, when the content percentage of silicon carbide is high, the impregnation with an aluminum alloy is not sufficiently performed in some cases.

Practically, a porous inorganic structure that contains 40 or more mass percent coarse silicon carbide powders preferably having an average particle diameter of 40 µm or more and in which the relative density of the porous inorganic structure is preferably in a range of 55 to 75 percent is suitable. As for the strength of the porous inorganic structure, it is preferable that the bending strength be 3 MPa or higher, for preventing a break at the time of handling or during the impregnation. Incidentally, the average particle diameter can be measured by using a scanning electron microscope ("JSM-T200" manufactured by JOEL Ltd., for example) and an image analysis apparatus (manufactured by Nippon Avionics Co., Ltd., for example) and calculating the average value of obtained diameters of 1000 particles. Further, the relative density can be measured by the Archimedes method etc. The bending strength can be measured by a tension tester (manufactured by SHIMADZU CORPORATION, for example).

For silicon carbide powders, it is preferable to perform a particle size control. By mixing coarse powders and fine powders, the strength reappearance does not decrease and the thermal conductivity of the composite to be obtained is enhanced. Therefore, mixed powders of 40 to 80 mass percent coarse powders preferably having an average particle diameter of 40 to 150 µm and 60 to 20 mass percent fine powders preferably having an average particle diameter of 5 to 15 µm are suitable.

The porous silicon carbide ceramic sintered body is obtained by defatting and firing a compact of a mixture resulting from adding the binder in the silicon carbide powders. When the firing temperature is 800° C. or higher, a sintered body having a bending strength of 3 MPa or higher is obtained regardless of the atmosphere at the time of the firing.

In an oxidizing atmosphere, when the firing is performed at a temperature exceeding 1100° C., the oxidation of silicon carbide is promoted, and the thermal conductivity of the aluminum-silicon carbide composite decreases in some cases. Therefore, in the oxidizing atmosphere, it is preferable that the firing be performed at a temperature of 1100° C. or lower. The firing time is appropriately determined in accordance with conditions such as the size of the sintered body, the input amount into a firing furnace and the firing atmosphere.

The porous inorganic structure in the embodiment may be any silicon carbide ceramic sintered body, if the silicon carbide ceramic sintered body has open pores allowing the impregnation with the metal or the alloy and has a mechanical strength at which a break does not occur in the impregnation operation, as described above.

The fibrous inorganic material is arranged so as to be adjacent to the plate-shaped porous inorganic structure obtained by the above method. It is preferable that the fibrous inorganic material be a fibrous alumina. It is particularly preferable that the alumina fiber be a crystalline alumina fiber having an alumina content of 70 percent or more, because of a good affinity with the metal for the impregnation. The alumina fiber is inexpensive and easily available.

The fibrous inorganic material does not particularly require the mechanical intensity, and may be in any state of a blanket, a mat and the like.

The metal with which the porous inorganic structure comprising the porous silicon carbide ceramic sintered body and the fibrous inorganic material are impregnated may be any metal if the metal allows the achievement of the object of the embodiment, but a light alloy of aluminum, magnesium and the like, or an alloy of them is preferable in order to achieve a high thermal conductivity and a lightness. The alloy is not particularly limited, and a general-purpose aluminum alloy or magnesium alloy can be used.

In the case of the aluminum alloy, it is particularly preferable to be a casting aluminum alloy having a Si content of 4 to 10 percent, as exemplified by AC2A, AC2B, AC4A, AC4B, AC4C, AC8B, AC4D, AC8C, ADC10 and ADC12, or a wrought aluminum alloy of 1000 series, 2000 series, 3000 series, 4000 series, 5000 series, 6000 series or 7000 series, in terms of the ease of casting and the exertion of a high thermal conductivity.

As for the combination of the above porous inorganic structure and the above metal, an aluminum-silicon carbide composite in which aluminum or an aluminum alloy is used as the metal and silicon carbide is used as the porous inorganic structure is a particularly good combination in terms of the lightness, the high thermal conductivity and the adaptability to a ceramic substrate in thermal expansion.

In the embodiment, as the method for the impregnation with the metal, various conventionally known impregnation methods can be applied, but methods by the pressure casting are preferable, because the second phase containing a large amount of the metal needs to be formed on the surface of the composite. That is, in the case of the die casting method, it is possible to easily make the composite having the second phase on the surface, by making a cavity of the metal mold such that the cavity is larger than a preform by the quantity of the surface layer, arranging the fibrous inorganic material in a space other than the preform of the cavity and performing the impregnation with the metal.

In the case oaf the squeeze casting method, it is possible to easily make the composite, by performing the impregnation with the metal while the front and back surfaces and/or the side surfaces of the porous inorganic structure are sandwiched between the fibrous inorganic materials or while all surfaces are wrapped, or by arranging the fibrous inorganic material on the inner surface of the metal mold and performing the impregnation with the metal.

In the embodiment, the fibrous inorganic material only has to be provided so as to be adjacent to the porous inorganic structure. The "adjacent" means a state where the fibrous inorganic material directly contacts with the porous inorganic structure adjacently. In the embodiment, the fibrous inorganic material can be provided so as to be adjacent to the front and back surfaces and/or the side surfaces of the porous inorganic structure. The case where all surfaces (that is, the front and back surfaces and the side surfaces) of the circumstance of the porous inorganic structure are covered with the fibrous inorganic material is preferable, because the second phase having a good cutting work property exists on the surfaces of the composite to be obtained as a result.

It is preferable that the percentage of the porous silicon carbide ceramic sintered body in the first phase be 50 to 80 volume percent. Further, it is preferable that the percentage of the fibrous inorganic material in the second phase be 3 to 20 volume percent. By adopting such a configuration, at the time of the impregnation with the metal, it is possible to suppress a local temperature unevenness and make a uniform composite, and it is possible to suppress the breakage of the porous inorganic structure due to a partial decrease in the flow property of the molten metal. Therefore, it is possible to stably obtain the composite at a good productivity.

Such a configuration can be made by setting 20 to 50 volume percent as the porosity of the porous silicon carbide ceramic sintered body in the first phase and setting 80 to 97 volume percent as the porosity of the fibrous inorganic material in the second phase.

Incidentally, the porosity can be obtained by calculation, from the difference between the theoretical density and the relative density (measured by the Archimedes method). Further, the method for adjusting the porosity is not particularly limited. For example, the porosity of the fibrous inorganic material can be adjusted by compressing or loosening a felt-shaped fibrous inorganic material. The porosity of the porous silicon carbide ceramic sintered body can be adjusted by the pa size blending of the silicon carbide powders to be used, the additive amount of the binder, and the like.

Furthermore, in the embodiment, by adjusting the porous inorganic structure, the fibrous inorganic material and the size of the space in the mold into which the molten metal is poured, it is possible to make, for example, a composite including a layer comprising a second phase having a shape in which a part protrudes in a fin shape, a composite including a hole filled with a layer comprising a second phase, a composite including a layer comprising a second phase in which the thickness of a part is larger, and the like Moreover, by applying conventionally known metal processing methods to the layer comprising the second phase, it is possible to obtain composites having various shapes.

Here, the conventionally known metal processing methods are not limited to machining methods, as exemplified by the surface grinding method and the drilling method, and means all methods that can be applied to the metal processing.

Accordingly, the thickness of the layer comprising the second phase, that is, the thickness of the fibrous inorganic material that is arranged so as to be adjacent to the porous inorganic structure only has to be at least 0.5 μm or more, although the thickness varies depending on the selected metal processing method, the dimensional accuracy of the composite after the processing, and the like.

In the case of applying a general-purpose machining method with a low cost and a high productivity from the metal processing methods, the thickness of the layer comprising the second phase preferably should be 50 μm or more, and further preferably should be 1 mm or more. Incidentally, the upper limit has no reason to be limited particularly. However, in the case of exceeding 20 mm, for example, in the use as a heat-dissipating component for a semiconductor-mounted circuit board, there is a concern that it is not possible to exert the features of the composite, that is, a high thermal conductivity and a low coefficient of thermal expansion. Further, because of a significant difference in the coefficient of thermal expansion between the first phase and the second phase, it is difficult to keep the flatness of the composite. Therefore, preferably, the thickness of the layer comprising the second phase should be 20 mm or smaller.

[Composite]

According to the production method for the composite in the above embodiment, as shown in FIG. 1, it is possible to obtain a composite 1 having a structure in which a first phase 2 and second phases 3 are adjacent to each other, the first phase 2 being a phase in which the plate-shaped porous inorganic structure comprising the porous silicon carbide ceramic sintered body is impregnated with the metal, the second phase 3 being a phase in which the fibrous inorganic material is impregnated with the metal, the percentage of the porous silicon carbide ceramic sintered body in the first phase 2 being 50 to 80 volume percent, the percentage of the fibrous inorganic material in the second phase 3 being 3 to 20 volume percent.

Since the first phase 2 and the second phase 3 are continuously connected with each other by the same metal, the composite 1 having the above configuration exerts the effect of the prevention of the separation or the like on the interface formed by the porous inorganic structure and the fibrous inorganic material that are adjacent to each other.

In the example of FIG. 1, through-holes 4 that pass through the front and back plate surfaces of the plate-shaped composite 1 are provided. In terms of the workability in the formation of the through-holes 4, it is preferable that the first phase 2 be not formed around the through-holes 4. For such a structure, cutouts or through-holes having a larger diameter than the through-holes 4 only has to be provided around portions where the through-holes 4 are formed in advance when the porous inorganic structure is formed.

In the example of FIG. 1, a metal layer 5 is formed so as to cover all surfaces of the circumference of the first phase 2 and the second phases 3. The metal layer 5 may be provided on only the front and back plate surfaces of the composite.

The composite according to the above embodiment, for example, can be applied as an abrasion-resistant material for a piston component of a vehicle and a heat radiation material for a heatsink or the like.

EXAMPLES

Hereinafter, the present invention will be described in more detail based on Examples and Comparative Examples.

Example 1

Silica sol (SNOWTEX manufactured by NISSAN CHEMICAL INDUSTRIES, LTD.) was added as the binder at a solid content concentration of 5 mass percent in silicon carbide (GS-500S manufactured by YAKUSHIMADENKO CO., LTD.) having an average particle diameter of 30 μm, and after mixing and press forming, the resulting object was fired at 900° C. in air for 2 hours, so that a porous silicon carbide structure having a porosity of 40 percent and a size of 100 mm×100 mm×3 mm was made.

Each of ten porous silicon carbide structures was sandwiched between two alumina felts having a thickness of 10 mm (felts made of DENKA ALCEN manufactured by Denka Company Limited and having a porosity of 90 percent), and they were put in a metal mold having an inner diameter of 200 mm. Furthermore, an aluminum alloy molten at 800° C. and containing 12 mass percent Si and 1 mass percent Mg was poured into the metal mold, and the pressurization was performed at a pressure of 100 MPa by a push rod, so that a composite was made.

After cooling, the composite was cut. Here, the thickness of the second phase (the phase in which the alumina felt was impregnated with the aluminum alloy) was 2 mm. The breakage condition was visually observed. No abnormality was recognized.

Incidentally, in this case, the percentage of the porous silicon carbide ceramic sintered body in the first phase was 60 volume percent, and the percentage of the fibrous inorganic material in the second phase was 10 volume percent.

Example 2

Silicon carbide (NG-F80 manufactured by Pacific Rundum Co., Ltd.) having an average particle diameter of 220 μm, silicon carbide GC #750 manufactured by YAKUSHIMADENKO CO., LTD.) having an average particle diameter of 16 μm and silicon carbide (NG-4S manufactured by Pacific Rundum Co., Ltd.) having an average particle diameter of 0.8 μm were blended at a ratio of 6:3:1, and the silica sol (SNOWTEX manufactured by NISSAN CHEMICAL INDUSTRIES, LTD.) was added as the binder solid content concentration of 5 mass percent. After mixing and press forming, the resulting object was fired at 900° C. in air for 2 hours, so that a porous silicon carbide structure having a porosity of 25 percent and a size of 100 mm×100 mm×3 mm was made.

Each of ten porous silicon carbide structures was sandwiched between two alumina felts (thickness oaf 10 mm) resulting from loosening felts (porosity of 90 percent) made of DENKA ALCEN manufactured by Denka Company Limited such that the porosity was 94 percent, and they were put in the metal mold having an inner diameter of 200 mm. Furthermore, the aluminum alloy molten at 800° C. and containing 12 mass percent Si and 1 mass percent Mg was poured into the metal mold, and the pressurization was performed at a pressure of 100 MPa by the push rod, so that a composite was made.

After cooling, the composite was cut. The thickness of the second phase (the phase in which the alumina felt was impregnated with the aluminum alloy) was 1.5 mm. The breakage condition was visually observed. No abnormality was recognized.

Incidentally, in this case, the percentage of the porous silicon carbide ceramic sintered body in the first phase was 75 volume percent, and the percentage of the fibrous inorganic material in the second phase was 6 volume percent.

Example 3

Silicon carbide (NG-F150 manufactured by Pacific Rundum Co., Ltd.) having an average particle diameter of 100 μm and silicon carbide (GC-1000F manufactured by YAKUSHIMADENKO CO., LTD.) having an average particle diameter of 11 μm were blended at a ratio of 7:3, and the silica sol (SNOWTEX manufactured by NISSAN CHEMICAL INDUSTRIES, LTD.) was added as the binder at a solid content concentration of 5 mass percent. After mixing and press forming, the resulting object was fired at 900° C. in air for 2 hours, so that a porous silicon carbide structure having a porosity of 45 percent and a size of 100 mm×100 mm×3 mm was made.

Each of ten porous silicon carbide structures was sandwiched between two alumina felts (thickness of 10 mm) resulting from compressing felts (porosity of 90 percent) made of DENKA ALCEN manufactured by Denka Company Limited such that the porosity was 82 percent, and they were put in the metal mold having an inner diameter of 200 mm. Furthermore, the aluminum alloy molten at 800° C. and containing 12 mass percent Si and 1 mass percent Mg was poured into the metal mold, and the pressurization was performed at a pressure of 100 MPa by the push rod, so that a composite was made. After cooling, the composite was cut. The thickness of the second phase (the phase in which the alumina felt was impregnated with the aluminum alloy) was 2.5 mm. The breakage condition was visually observed. No abnormality was recognized, Incidentally, in this case, the percentage the porous silicon carbide ceramic sintered body in the first phase was 55 volume percent, and the percentage of the fibrous inorganic material in the second phase was 18 volume percent.

Comparative Example 1

The same operation as Example 1 was performed, except that the alumina felts were not used. Whether the obtained ten composites were abnormal was observed. In one composite, an ultrasonic flaw detector found that the porous silicon carbide structure within the composite broken over the whole width in the short direction. In four composites, cracks of about 3 to 10 mm were recognized by appearance observation. Incidentally, in this case, the percentage of the porous silicon carbide ceramic sintered body in the first phase was 60 volume percent.

Comparative Example 2

The same operation as Example 3 was performed, except that the porosity of the alumina felt is 75 percent. Whether the obtained ten composites were abnormal was observed. In three composites,t was recognized that the alumina felt was not impregnated with the aluminum alloy. The thickness of the second phase (the phase in which the alumina felt was impregnated with the aluminum alloy) was 5 mm.

Incidentally, in this case, the percentage of the porous silicon carbide ceramic sintered body in the first phase was 55 volume percent, and the percentage of the fibrous inorganic material in the second phase was 25 volume percent.

Comparative Example 3

The same operation as Example 2 was performed for obtaining a porous silicon carbide structure having a porosity of 15 percent, but the making was impossible. Incidentally, the assumed percentage of the porous silicon carbide ceramic sintered body in the first phase was 85 volume percent.

Comparative Example 4

The same operation as Example 2 was performed for obtaining a porous silicon carbide structure having a porosity of 60 percent, but the making was impossible. Incidentally, the assumed percentage of the porous silicon carbide ceramic sintered body in the first phase was 40 volume percent.

Comparative Example 5

The same operation as Example 1 was performed, except that the felt (porosity of 90 percent) made of DENKA ALCEN was loosened such that the porosity of the alumina felt was 98 percent. Whether the obtained ten composites were abnormal was observed. In four composites, cracks of about 3 to 10 mm were recognized by appearance observation. The thickness of the second phase (the phase in which the alumina felt was impregnated with the aluminum alloy) was 1 mm. Incidentally, in this case, the percentage of the porous silicon carbide ceramic sintered body in the first phase was 60 volume percent, and the percentage of the fibrous inorganic material in the second phase was 2 volume percent.

Table 1 shows the summary of the above Examples 3 and Comparative Examples 1 to 5.

TABLE 1

| | Porosity of porous silicon carbide structure (%) | Porosity of alumina felt (%) | Condition of composite body |
|---|---|---|---|
| Example 1 | 40 | 90 | Good |
| Example 2 | 25 | 94 | Good |
| Example 3 | 45 | 82 | Good |
| Comparative Example 1 | 40 | — | Break/Crack |
| Comparative Example 2 | 45 | 75 | Some not impregnated |
| Comparative Example 3 | Making was impossible | Making was impossible | Making was impossible |
| Comparative Example 4 | Making was impossible | Making was impossible | Making was impossible |
| Comparative Example 5 | 40 | 98 | Crack |

As can be seen from the results in Table 1, the composite made by the production method according to the present invention does not cause a break and a crack in the porous silicon carbide structure, and does not produce a portion where the it impregnation with the metal is not performed. Thus, according to the production method for the composite and the composite produced by the production method the present invention, it is possible to suppress the breakage of the porous inorganic structure included in the composite, and to stably make the composite.

REFERENCE SIGNS LIST 1 composite
2 first phase
3 second phase
4 through-hole
5 metal layer

The invention claimed is:

1. A production method for a composite comprising impregnating a plate-shaped porous inorganic structure and a fibrous inorganic material with a metal while the fibrous inorganic material is arranged so as to be adjacent to the porous inorganic structure, wherein
the composite has a structure in which a first phase and a second phase are adjacent to each other by using the porous inorganic structure comprising a porous silicon carbide ceramic sintered body and the fibrous inorganic material having a porosity of 80 to 97volume percent, the first phase being a phase in which the porous silicon carbide ceramic sintered body is impregnated with the metal, the second phase being a phase in which the fibrous inorganic material is impregnated with the metal,
a percentage of the porous silicon carbide ceramic sintered body in the first phase is 50 to 80 volume percent, and
a percentage of the fibrous inorganic material in the second phase is 3 to 20 volume percent.

2. The production method for the composite according to claim 1, wherein the method for the impregnation with the metal is a die casting method or a squeeze casting method.

3. The production method for the composite according to claim 1, wherein the metal is aluminum or an aluminum alloy.

4. The production method for the composite according to claim 1, wherein a thickness of a layer comprising the second phase is 1 mm or more.

5. The production method for the composite according to claim 1, wherein all surfaces of a circumference of the porous silicon carbide ceramic sintered body are covered with the fibrous inorganic material, or the porous silicon carbide ceramic sintered body is sandwiched between two sheets of the fibrous inorganic material.

6. The production method for the composite according to claim 1, wherein the porosity of the fibrous inorganic material is 82 to 94 volume percent.

7. The production method for the composite according to claim 1, wherein a porosity of the porous silicon carbide ceramic sintered body is set to 20 to 50 volume percent.

8. A composite having a structure in which a first phase and a second phase are adjacent to each other, the first phase being a phase in which a plate-shaped porous inorganic structure comprising a porous silicon carbide ceramic sintered body is impregnated with a metal, the second phase being a phase in which a fibrous inorganic material having a porosity of 80 to 97 volume percent is impregnated with the metal, a percentage of the porous silicon carbide ceramic sintered body in the first phase being 50 to 80 volume percent, a percentage of the fibrous inorganic material in the second phase being 3 to 20 volume percent.

9. The composite according to claim 8, wherein the metal is aluminum or an aluminum alloy.

10. The composite according to claim 8, wherein a thickness of a layer comprising the second phase is 1 mm or more.

11. The composite according to claim 8, wherein all surfaces of a circumference of the first phase are covered with the second phase, or the first phase is formed on only front and back plate surfaces of the second phase.

12. The composite according to claim 8, wherein the porosity of the fibrous inorganic material is 82 to 94 volume percent.

13. The composite according to claim 8, wherein a porosity of the porous silicon carbide ceramic sintered body is set to 20 to 50 volume percent.

* * * * *